March 1, 1960 — J. F. HUFF — 2,926,691
ELECTRIC PRESSURE REGULATOR
Filed Feb. 23, 1955 — 2 Sheets-Sheet 1

INVENTOR.
JOSEPH F. HUFF
BY
Kenway, Jenney, Witter & Hildreth
ATTORNEYS

March 1, 1960     J. F. HUFF     2,926,691
ELECTRIC PRESSURE REGULATOR

Filed Feb. 23, 1955     2 Sheets-Sheet 2

*INVENTOR.*
JOSEPH F. HUFF
BY
*Kenway, Jenney, Witter & Hildreth*
ATTORNEYS

United States Patent Office

2,926,691
Patented Mar. 1, 1960

2,926,691

ELECTRIC PRESSURE REGULATOR

Joseph F. Huff, Hyde Park, Mass., assignor, by mesne assignments, to American Radiator & Standard Sanitary Corporation, New York, N.Y., a corporation of Delaware Application February 23, 1955, Serial No. 489,884

4 Claims. (Cl. 137—487.5)

This invention relates to pressure regulators and more particularly to devices for producing fluid pressures which are any desired mathematical function of an electrical control signal.

Pressure regulators presently available have a number of undesirable features which limit their versatility; namely, restricted total flow bleed type valves susceptible to clogging by dirt or other impurities introduced into the mechanism by the flow stream, rather complicated electronic control equipment, and the lack of means to obtain pressures which are non-linear a predeterminal degree with respect to the control signal.

One important object of this invention is to provide a pressure regulator capable of maintaining fluid pressures linear or non-linear a predeterminal degree with respect to a control signal fed to the instrument.

Another important object of this invention is to provide a pressure regulator capable of handling rather large total flows.

Still another important object of this invention is to eliminate bleed type valve mechanisms from pressure regulating instruments, thereby preventing break down of the device due to clogging.

Still another object of this invention is to provide a pressure regulator free of complicated control circuitry.

To accomplish these and other objects I provide as one important feature of this invention a balanced beam pivotally mounted about a fulcrum and subjected at oppositie ends to an electromagnetically controlled force and a force caused by fluid pressure.

Another feature of this invention is an electromagnetically operated flapper valve whose position is controlled by a switch directly influenced by the movement of the balanced beam.

Figure 1:
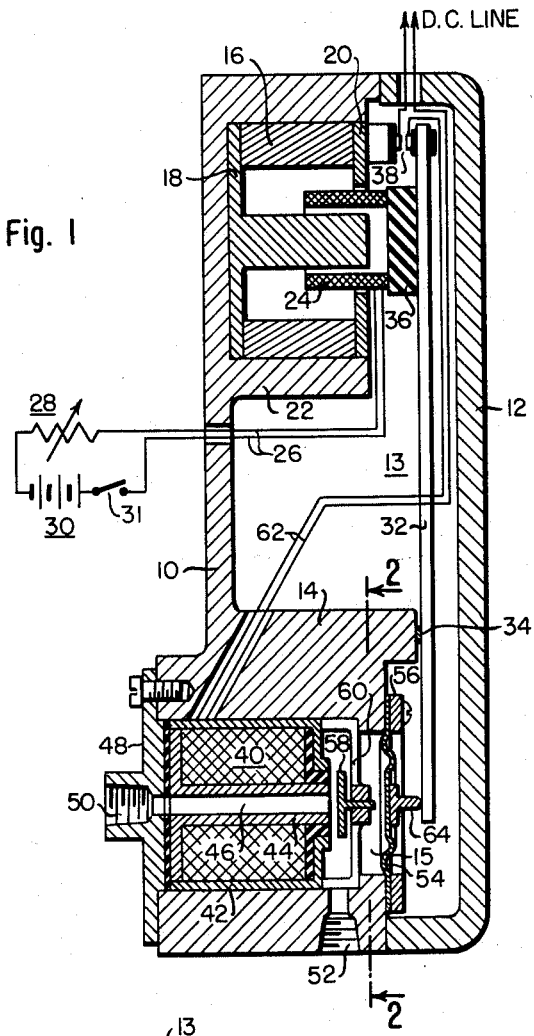
Figure 2:
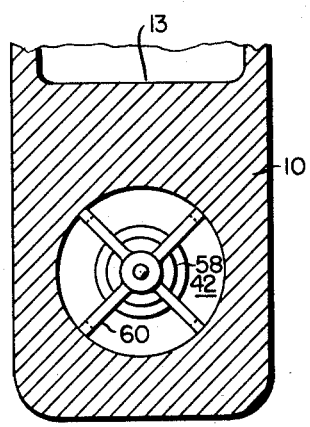
Figure 3:
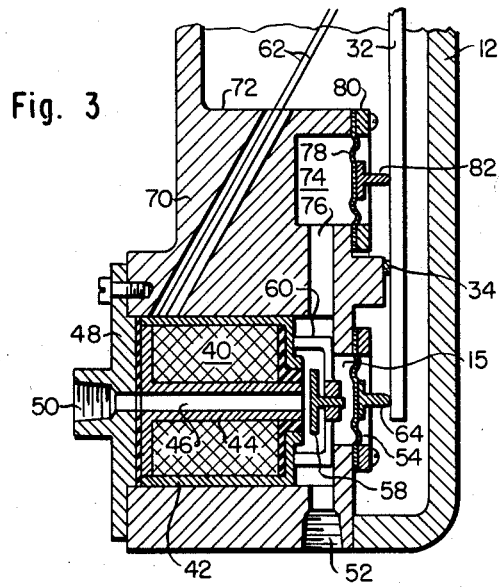
Figure 4:
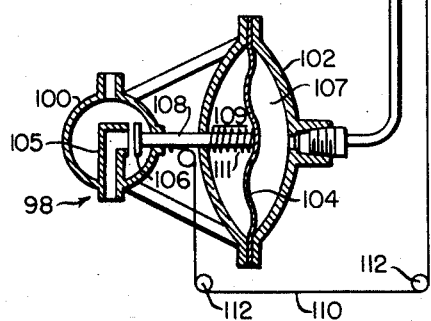

These and other objects and features of this invention will be better understood and appreciated from a reading of the following detailed description of a number of embodiments thereof selected for purposes of illustration and shown in the accompanying drawings in which:

Fig. 1 is a view in section of an electric pressure regulator constructed in accordance with this invention, Fig. 2 is a detailed view in section of the regulator taken along sight lines 2—2 of Fig. 1, Fig. 3 is a fragmentary view in section of another electric pressure regulator constructed in accordance with this invention, and Fig. 4 is a view in section of another embodiment of a pressure regulator illustrating one specific use for the device.

Proceeding now with a detailed description of the embodiment of the invention illustrated in Figs. 1 and 2, an inspection of the drawing reveals that the instrument is organized within a case 10 and a cover 12. The enclosure formed by the cover and the case is subdivided into chambers 13 and 15 by a wall or partition 14, the chamber 13 housing the control equipment while the chamber 15 substantially defines a flow path for the fluid whose pressure is to be regulated.

A permanent magnet 16 positioned within the chamber 13 serves to energize a magnetic circuit defined by a core 18 and a conducting ring 20. A flux field of constant strength is established by the permanent magnet within the gap of the magnetic circuit. A flange 22 integrally cast with the casing defines a seat for the above-named elements.

Concentrically mounted with the core is a coil 24 freely movable in the gap between the core and the ring. A pair of conductors 26 serve as the control current supply lines for the coil and extend through the chamber 13 and an opening in the casing to a variable source of direct current diagrammatically represented by a variable resistance 28 and a battery 30. As the coil is energized by closing a switch 31 on the control circuit, a magnetic field will be created within the gap which may, by the proper selection of relative polarities, oppose the field created by the permanent magnet and cause the coil to move axially out of the gap.

A beam 32 mounted within the case and the cover extends substantially across the enclosure. The beam or lever 32 is mounted for pivotal movement about a pivot plate 34 and is directly influenced by the movement of the coil. An insulated block 36 carried by the coil transmits motion of the coil to the lever. Energization of the coil, therefore, will pivotally move the lever clockwise about the plate 34 and open a switch 38 whose function will be defined in detail in the following paragraphs. Obviously the force exerted on the lever will be directly proportional to the strength of the current supplied to the coil from the variable direct current source.

Having described in detail the control apparatus contained in the chamber 13, the regulating mechanism which directly acts on the fluid whose pressure is to be regulated will now be described. Mounted in the chamber 15 is a magnetic annular core 44 and a shell 42 which together define a housing for a fixed coil 40. The core 44 has passing through its center a fluid passage which registers with a threaded pipe fitting 50 in the disc 48 secured to the case. A threaded pipe fitting 52 is formed in the peripheral wall of the casing in fluid communication with the passage 46 to provide an outlet for the fluid introduced into the chamber 15. A diaphragm 54 extending between the peripheral wall of the casing and the partition 14 and secured in position by a retaining ring 56 prevents the fluid passing into the chamber 15 from spreading to the other parts of the regulator.

Flow through the chamber 15 is controlled by a flapper valve 58 operated by the coil 40. The valve is movably secured adjacent the bottom of the passage 46 by the engagement of its stem and a hub of a spider 60.

A pair of leads 62 connected to the fixed coil 40 extend across the casing and out through its wall and furnish a supply current to the coil. Energization of the coil, however, is controlled by the switch 38 which interrupts the otherwise direct connection between the coil and a D.C. line. When the switch 38 is closed, the coil 40 will energize attracting the valve 58 to its seat on the end of passage 46. Opening of the switch 38 on the other hand will deenergize the coil and permit the pressure of the fluid introduced through the inlet 50 to unseat the valve, resulting in a pressure build-up in the chamber 15.

The diaphragm 54 extending across the bottom of the chamber 15 carries a finger 64 which engages the lower end of the lever 32. Pressure exerted on the diaphragm due to a pressure build-up within the chamber 15 will therefore exert a force on the lever in opposition to the force exerted by the coil 24.

Having thus described in detail the various elements of the electric pressure regulator shown in Fig. 1, its mode of operation will now be described. Assume initially that the lever 32 is in a position closing the switch 38, the coil 24 is deenergized, and the valve 58 prevents fluid flow through the chamber 15. Upon energization of the coil 24, a field will be created opposing the field of the permanent magnet 16 and a force directly proportional to the current supplied to the coil will be exerted against the lever through the block 36. The clockwise rotation of the lever about the pivot 34 will be unopposed for no pressure build-up will have occurred in the chamber 15. However, upon clockwise rotation of the beam or lever, switch 38 will be opened, deenergizing the coil 40. The valve 58 will then open due to the pressure of the fluid in the passage 46, and pressure will build-up in the chamber 15. When the pressure within the chamber is sufficient to exert a torque against the lever 32 through finger 64 greater than the torque exerted by the movable coil 24, the coil 24 will move against the magnetic field of the permanent magnet and the switch 38 will close, energizing the fixed coil 40 and closing the valve 58. A pressure drop will occur in the chamber 15. This cycle will be repeated at a very rapid rate with forces at the opposite ends of the lever always tending to equalize. As the control current to the movable coil is varied, the equalizing force exerted by the diaphgragm will change and the frequency of the cycle will also vary due to the expanding rate of the fluid. If, for example, low pressure gas is desired, the control current to the coil 24 will be decreased. The reduced flow of current to the coil will proportionately decrease the strength of the electromagnetic field and will result in a proportionately smaller force exerted on the lever. The reduced force will result in a relatively larger unbalance of the forces on the lever, and the switch 38 will remain closed until the gas in chamber 15 expands and the pressure due to this expansion has diminished sufficiently to equalize the forces exerted on the lever by the diaphragm and the coil. The cycle will then continue at a new rate because the volume of high pressure gas passing the valve 58 will not have to be as large to maintain the pressure in the chamber 15. The pressure of gas flowing through the outlet port 52 will be directly proportional to the amount of current supplied to the movable coil, and the flow will pulsate slightly at a very rapid rate.

The embodiment of this invention shown in Fig. 3 permits the use of considerably smaller control currents fed to the movable coil for regulating the fluid pressure. To accomplish the added sensitivity, a pair of diaphragms responsive to the pressure build-up in the chamber 15 have been substituted for the single diaphragm in the previously described embodiment. Because the structure contained in chamber 13 is wholly duplicated in this alternative form of the invention, only the apparatus which directly acts upon the fluid has been illustrated.

Proceeding now to a detailed description of the alternative embodiment shown in Fig. 3, it will be observed that a casing 70 similar to the previously described casing 10 has integrally formed therewith an enlarged partition 72 which generally divides the cavity within the case and the cover into the two chambers 13 and 15. Within the chamber 15 is mounted the fixed coil 40 which controls the valve 58 in the path of the fluid flow. The diaphragm 54 responds to the pressure within the chamber 15 and exerts a force on the lever 32 in a manner identical to that previously described. Therefore, a detailed description of this action would be wholly repetitious.

The following structure not present in the embodiment shown in Fig. 1 will be described in detail. A second pressure chamber 74 which communicates with the chamber 15 through a duct 76 is also responsive to pressure build-up caused by the opening of the valve 58. A diaphragm 78 serving as a wall of the chamber 74 and secured to the partition by the retaining ring 80 carries a finger 82 for exerting a force against the lever 32 in opposition to the force exerted by the finger 64 carried by the other diaphragm. The finger 82 abuts the lever on the side of the fulcrum opposite to that of the finger 64 and each exerts an equal force against it. However, as is evidenced by an inspection of the drawing, the finger 64 is displaced from the fulcrum 34 a distance greater than the distance from the fulcrum to the other finger, resulting in a net moment exerted on the beam or lever causing counter-clockwise rotation thereof. It will be appreciated that this force is considerably less than the similar force exerted by the above described embodiment. As a result, the necessary force exerted by the movable coil to balance the net moment impressed by the diaphragms is substantially smaller. The reduced force permits the use of smaller energizing currents for the movable coil.

The embodiment shown in Fig. 4 illustrates an adaptation of the pressure regulator as a positioning device for a standard type pressure operated valve. The pressure regulator is very similar to the regulators described in the preceding embodiments. However, the diaphragm in the casing forming the right wall of the chamber 15 has been eliminated. In detail, the casing 10 has been replaced by a casing 90 having a partition 92 and a wall 94 defining the housing for the fixed coil and the flow path for the fluid whose pressure is to be regulated. Connected to the outlet 52 in the wall of the casing is a conduit 96 which carries the controlled fluid to the pressure globe 102 of a stand type pressure controlled valve assembly 98. A valve chamber 100 has formed therein a partition 105 which cooperates with a valve 106 to regulate the flow of fluid through the chamber.

The valve 106 has a depending valve stem 108 secured at its end to a diaphragm 104 extending across the globe 102. Actuation of the valve is controlled by the diaphragm. The diaphragm divides the globe into a pressure chamber 107 and a second chamber 109, the pressure chamber being in direct communication with the conduit 96. Therefore, when valve 58 is permitted to be opened by the pressure of the fluid entering the regulator casing through the passage 50 (switch 38 being opened), a pressure will be exerted against the underside of the diaphragm 104 urging the valve 106 toward its seat formed in the partition 105. Movement of the valve 106 towards its closed position will be opposed by the pressure within the chamber 109. A compression spring 111 within the chamber 109 may be employed as an additional means for opposing the variable fluid pressure exerted against the underside of the diaphragm.

To counteract the force applied by the movable coil 24 against the lever 32, a wire 110 is connected between the valve stem 108 and the left end of the lever. As the valve stem is actuated by the diaphragm, the wire 110 will exert a force on the lever causing it to rotate counter-clockwise about its fulcrum. It is to be understood that the wire and pulleys 112 illustrated are merely a diagrammatic representation of one means for transferring force from the valve stem to the lever, and that countless other arrangements may be made to perform the identical function. A spring 114 forming part of the mechanical connection between the valve stem and the lever exerts the force on the lever, instead of the diaphragms of the previously described configurations.

It will be appreciated that instead of regulating pressure, the device shown in Fig. 4 controls the position of the valve 106. The spring 114 can exert a force on the lever either proportional to or some other function of the force exerted on the diaphragm. Therefore, the flow through the valve 106 may be any desired function of the control current applied to the movable coil.

From the foregoing description, it will be apparent that numerous modifications of the illustrated pressure regulators may be devised without departing from the scope of the invention. The specific configuration of the flapper valve, for example, is not a limiting feature of this invention. Moreover, countless uses for the regulator quite distinct from the use illustrated will also occur to men skilled in the art. Therefore, it is not intended that the invention be limited to the specifically described and illustrated embodiments, but by the appended claims and their equivalents.

What I claim as new and desire to secure by Letters Patent of the United States is:

1. Apparatus of the class described comprising a casing, magnetic means mounted in said casing for establishing a magnetic field, movable coil means mounted in said field, means for energizing said coil for establishing a magnetic field opposed to the field of said magnetic means moving said coil out of said field, a lever pivotally mounted in said casing movable by said coil means, a fluid passage in said casing, a valve in said passage, electrical means operatively associated with said valve for closing said valve, an energizing circuit for said electrical means, a switch in said circuit controlled by said lever movable to an open position when said lever is moved by said coil means, a pressure chamber in fluid communication with said passage when said valve is in its open position, and means responsive to fluid pressure in said chamber including a movable member operatively associated with said lever for exerting a force on said lever in opposition to the force exerted on said lever by said movable coil means.

2. Apparatus of the class described comprising a casing, a fluid passage through said casing, a valve controlling the flow of fluid through said passage, electromagnetic means operatively associated with said valve for closing said valve and a circuit therefor, a pair of pressure chambers communicating with said passage when said valve is opened, a lever, means responsive to the fluid pressures in said chambers including movable members operatively associated with said lever for exerting opposed unbalanced forces having a resultant net force against said lever, electrical means for exerting a force on said lever proportional to the signal fed to said electrical means opposed to the net force exerted by the fluid pressure responsive means, and switch means responsive to movement of said lever in the direction urged by said electrical means in said circuit.

3. Apparatus of the class described comprising a casing, a fluid passage in said casing, an electromagnet mounted in said casing and an energizing circuit therefor, a valve in said passage responsive to energization of said electromagnet for closing said passage, a pressure chamber communicating with said passage for receiving fluid from said passage when said valve is open, means including a movable member responsive to fluid pressure in said chamber, electrical means for exerting a variable force on said movable member in accordance with the pressure to be maintained in said passage to oppose the movement of said member, and means in said energizing circuit responsive to movement of said member controlling energization of said electromagnet, whereby said valve is caused to open and close periodically in rapid succession to maintain a pulsating fluid flow in said passage at said pressure.

4. An electric pressure regulator comprising a housing, a partition dividing said housing substantially into first and second compartments, a control means disposed in said first compartment, said control means including elements forming a magnetic circuit, a beam having one end extending into said first compartment and connected to a movable element of said magnetic circuit, means for introducing fluid into said second compartment, a valve in said second compartment responsive to said control means for regulating the flow of fluid therethrough, a pressure-sensitive wall disposed in said second compartment between said partition and said housing, said pressure-sensitive wall being adapted to act upon the other end of said beam in opposition to the action of said movable magnetic circuit element to control said valve, means for energizing said magnetic circuit, and means for adjusting said last-mentioned means to vary the point of regulation of said valve.

References Cited in the file of this patent

UNITED STATES PATENTS

| 1,655,003 | Woodford | Jan. 3, 1928 |
| 2,310,562 | Whittington | Feb. 9, 1943 |
| 2,457,874 | Davis | Jan. 4, 1949 |
| 2,491,821 | Lerstrup | Dec. 20, 1949 |
| 2,662,547 | Comeau | Dec. 15, 1953 |
| 2,667,895 | Pool | Feb. 2, 1954 |
| 2,816,570 | Coulbourn | Dec. 17, 1957 |

FOREIGN PATENTS

| 537,497 | Germany | Nov. 4, 1931 |
| 781,793 | France | Mar. 4, 1935 |